United States Patent
Luh et al.

(10) Patent No.: US 9,048,743 B2
(45) Date of Patent: Jun. 2, 2015

(54) CONTROLLING AN ADAPTER TRANSFORMER VOLTAGE

(75) Inventors: Louis Luh, Sunnyvale, CA (US); Eric G. Smith, Palo Alto, CA (US)

(73) Assignee: APPLE INC., Cupertino, CA (US)

(*) Notice: Subject to any disclaimer, the term of this patent is extended or adjusted under 35 U.S.C. 154(b) by 286 days.

(21) Appl. No.: 13/570,031

(22) Filed: Aug. 8, 2012

(65) Prior Publication Data

US 2014/0043861 A1 Feb. 13, 2014

(51) Int. Cl.
   *H02M 3/335* (2006.01)

(52) U.S. Cl.
   CPC ................................ *H02M 3/33576* (2013.01)

(58) Field of Classification Search
   CPC ......... H02M 7/00; H02M 7/04; H02M 7/043; H02M 1/42; H02M 1/4233; H02M 3/335; H02M 2007/5387
   USPC ........... 323/205, 207, 266; 363/15–17, 21.04, 363/21.06, 21.12, 21.14, 124, 126, 132, 37
   See application file for complete search history.

(56) References Cited

U.S. PATENT DOCUMENTS

| | | | | |
|---|---|---|---|---|
| 3,973,165 A | * | 8/1976 | Hester | 315/105 |
| 4,422,139 A | * | 12/1983 | Burkhead | 363/21.04 |
| 5,157,592 A | * | 10/1992 | Walters | 363/17 |
| 5,402,329 A | * | 3/1995 | Wittenbreder, Jr. | 363/16 |
| 5,838,558 A | * | 11/1998 | Tan et al. | 363/91 |
| 2004/0264224 A1 | * | 12/2004 | Jang et al. | 363/97 |
| 2006/0164870 A1 | * | 7/2006 | Yasumura | 363/17 |
| 2008/0186742 A1 | * | 8/2008 | Seong | 363/17 |
| 2012/0014152 A1 | * | 1/2012 | Nakamura et al. | 363/126 |

\* cited by examiner

*Primary Examiner* — Timothy J Dole
*Assistant Examiner* — Shahzeb K Ahmad
(74) *Attorney, Agent, or Firm* — Park, Vaughan, Fleming & Dowler LLP; A. Richard Park

(57) ABSTRACT

An adapter for electrical power that includes a rectifier coupled to a transformer with a primary coil and a secondary coil. The secondary coil includes a first end tap, a second end tap, and a center tap. A first switch is coupled between the first end tap and a primary side ground. A second switch is coupled between the second end tap and the primary side ground. A controller is coupled to the first switch and to the second switch so that during one or more intervals, the first switch and the second switch are alternately open and closed a predetermined number of times, wherein the initial switch closed each interval alternates between the first switch and the second switch, and after the predetermined number of times, both the first switch and the second switch are opened for a predetermined time period.

15 Claims, 10 Drawing Sheets

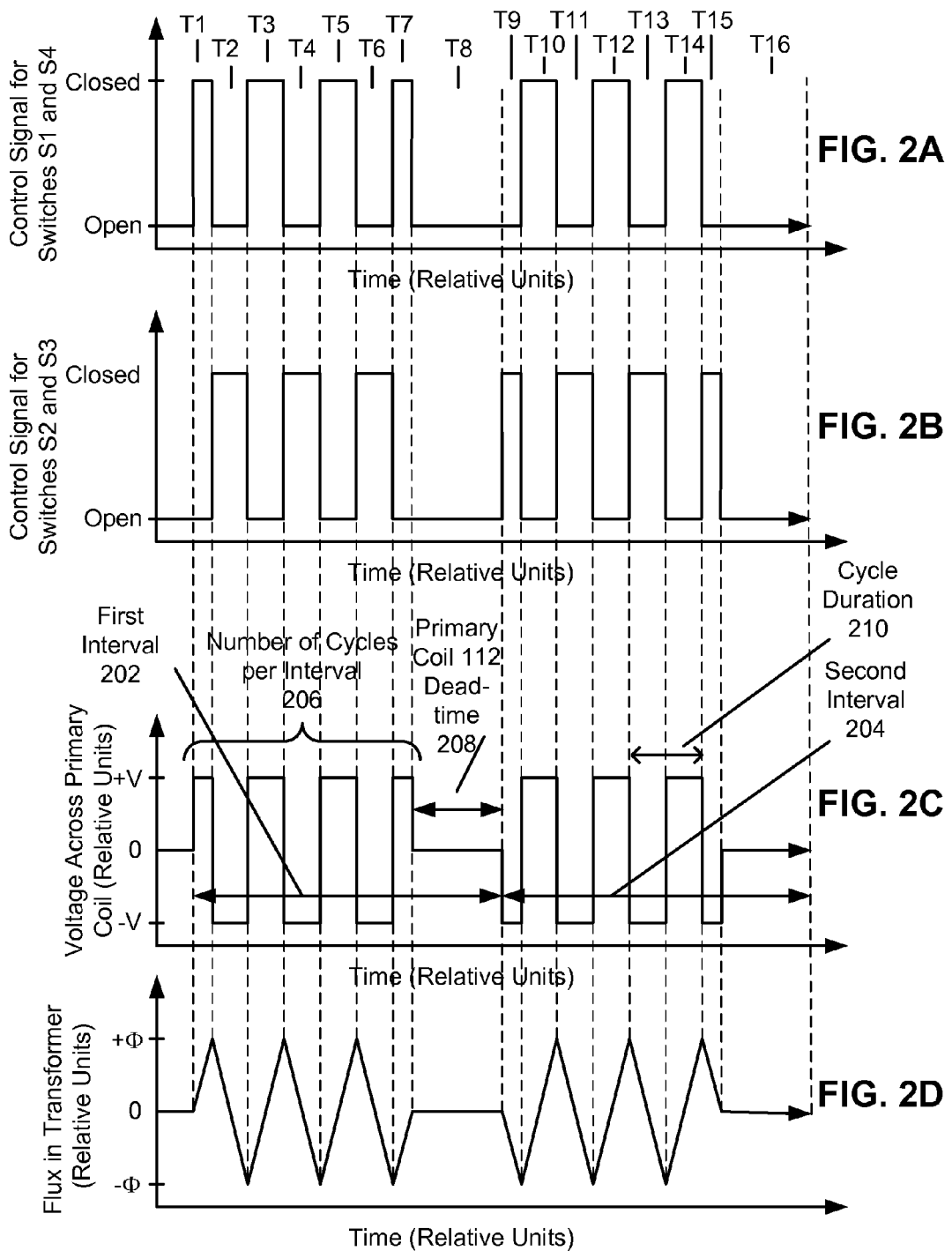

CONTROLLING AN ADAPTER TRANSFORMER VOLTAGE

BACKGROUND

1. Field

The present embodiments relate to power adapters. More specifically, the present embodiments relate to controlling a power adapter transformer voltage.

2. Related Art

Power adapters that are designed to supply power to electronic devices such as laptop computers often include a power factor correction (PFC) circuit. Typically, the PFC circuit steps-up the input voltage to a higher voltage, and in order to safely handle this voltage, the PFC circuit must include one or more high-voltage components. These components are often physically large and may take up a sizable portion of the adapter volume, which may interfere with other design considerations for the adapter.

BRIEF DESCRIPTION OF THE FIGURES

FIG. 2A depicts an exemplary graph of a control signal controlling two switches in an H-bridge coupled to the primary coil of a transformer in accordance with an embodiment.

FIG. 2B depicts an exemplary graph of a control signal controlling two other switches in an H-bridge coupled to the primary coil of a transformer in accordance with an embodiment.

FIG. 2C depicts an exemplary graph of the voltage across the primary coil of an adapter transformer in accordance with an embodiment.

FIG. 2D depicts an exemplary graph of the flux in the transformer due to the voltage across the coil depicted in FIG. 2C in accordance with an embodiment.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
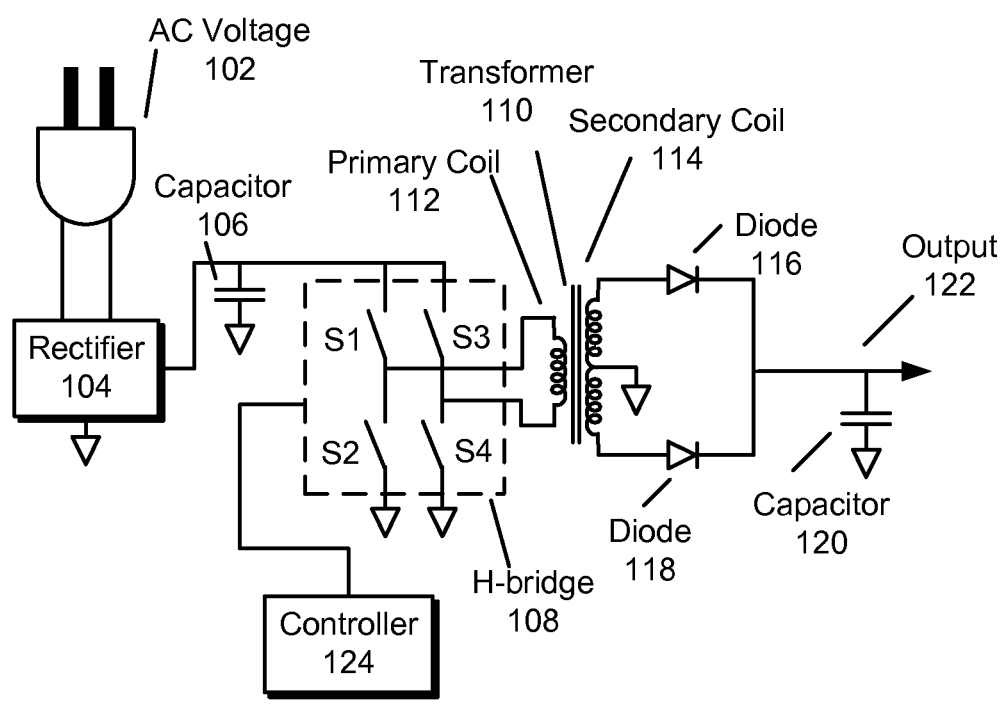
FIG. 1 shows a power adapter including an H-bridge and a transformer with a center-tapped secondary coil in accordance with an embodiment.

FIG. 1 shows an adapter in accordance with an embodiment. Alternating current (AC) voltage 102 is coupled to rectifier 104 across capacitor 106 and into H-bridge 108. Transformer 110 includes primary coil 112 and center tapped secondary coil 114. Primary coil 112 is coupled to the output of H-bridge 108, and secondary coil 114 is coupled through diode 116 and diode 118 across capacitor 120 to output 122. Controller 124 is coupled to and controls switches S1 through S4 in H-bridge 108.

AC voltage 102 is any device that outputs an AC voltage and may include but is not limited to a wall plug that can be plugged into an AC voltage outlet. For example, AC voltage 102 may be a standard wall plug that is plugged into an electrical outlet, and may be in any standard available in any country including but not limited to 80 volts to 240 volts AC electricity at from 50 Hz to 60 Hz. In some embodiments, AC voltage 102 also includes a line filter that filters the voltage from AC voltage 102.

Rectifier 104 is a voltage rectifier that converts the positive and negative voltage output from AC voltage 102 into voltage that is positive only. Rectifier 104 may include but is not limited to a full-bridge rectifier, or any other rectifier that outputs only a positive going voltage from an input that is positive and negative, and it may be implemented in any technology. Capacitor 106 may be any suitable capacitor selected based on factors including but not limited to voltage, capacity and leakage requirements, and may be implemented in any technology.

H-bridge 108 is any H-bridge that includes four individual switches S1 to S4, each of which is controlled by controller 124. H-bridge 108 uses switches S1 to S4 to control the voltage across primary coil 112 in transformer 110. For example, when switches S1 and S4 are closed and switches S2 and S3 are open, the voltage from the top to the bottom of primary coil 112 is positive; when switches S1 and S4 are open and switches S2 and S3 are closed, the voltage from the top to the bottom of primary coil 112 is negative; and when all switches S1 to S4 are open, there is no voltage across primary coil 112. Note that switches S1 to S4 can each be any type of switch implemented in any technology that can switch in response to a control signal. For example, switches S1 to S4 may include but are not limited to relays, or transistors such as FETs, including MOSFET transistors, and may be implemented using any combination of discrete and integrated components, and analog and/or digital technology.

Transformer 110 can be any transformer with a primary coil and a center tapped secondary coil implemented in any technology. The winding ratio of primary coil 112 to secondary coil 114 can be set to any value based on the input voltage and the desired output voltage. Transformer 110 may be a step-down transformer with a turns ratio between primary coil 112 and secondary coil 114 that may be set to any value based on AC voltage 102 and the desired voltage at output 120. For example, in some embodiments, for an expected input voltage of 90 to 120 volts from AC voltage 102 and a desired output voltage in the range of 20 to 30 volts, a turns ratio between primary coil 112 and each arm of secondary coil 114 may be chosen to be about 4:1, while for an expected input voltage of 220 to 240 volts from AC voltage 102 for the same desired output voltage range, the turns ratio may be chosen to be about 8:1. In other embodiments, a turns ratio in the range of 4:1 up to 8:1 may be used. Additionally, in some embodiments, a step-up converter is placed after capacitor 120 to step-up the voltage from secondary coil 114 based on a desired power factor of the adapter. In some embodiments, the step-up converter steps-up the voltage to between 40 volts and 50 volts, while in other embodiments, the voltage is stepped-up to a value less than 50 volts.

Diode 116 and diode 118 can be any suitable diodes implemented in any technology and may be implemented using any combination of discrete or integrated technology. Capacitor 120 is any suitable capacitor implemented in any technology.

Controller 124 is a controller implemented in any combination of hardware and/or software and in any technology, and may include any combination of integrated and discrete components and may be implemented in any hardware module or apparatus. For example, in some embodiments, one or more separate integrated circuit chips perform the indicated operations. In these embodiments, the integrated circuit chips can include specialized circuits that implement some or all of the above-described operations, and/or can include general-purpose circuits that execute program code (e.g., firmware, etc.) that causes the circuits to perform the operations.

Controller 124 controls each switch S1 to S4 in H-bridge 108 and may be coupled to (not shown) and use input received from rectifier 104 and output 122 to control switches S1 to S4. Note that the input to controller 124 from output 122 may include an isolation device or circuit (not shown) to electrically isolate the secondary side of transformer 110 from the primary side, and may also include a voltage divider (not shown) to reduce the feedback voltage from output 122 to controller 124. For example, a resistive voltage divider and an opto-isolator may be inserted in a feedback path from output 122 to controller 124.

Output 122 may be coupled to or configured to be coupled to any electronic device that uses direct current (DC) voltage to operate, including but not limited to a laptop computer, a tablet computer, a smartphone, and/or a battery charger.

The adapter in FIG. 1 operates as follows. AC voltage is output from AC voltage 102 and into rectifier 104. Rectifier 104 rectifies the AC voltage so that it contains only positive going voltage. This voltage is then input into H-bridge 108 and controller 124 controls switches S1 to S4 to control the voltage across primary coil 112.

FIGS. 2A and 2B depict exemplary graphs of control signals from controller 124 controlling, respectively, switches S1 and S4, and switches S2 and S3 in H-bridge 108 in accordance with an embodiment. FIG. 2C depicts an exemplary graph of the voltage across primary coil 112 as a result of the switching signals depicted in FIGS. 2A and 2B. FIG. 2D depicts an exemplary graph of the flux in transformer 110 due to the voltage across the coil depicted in FIG. 2C in accordance with an embodiment.

Note that for exemplary purposes only two intervals are depicted in each graph, first interval 202 and second interval 204. Embodiments may include more or fewer intervals. First interval 202 includes time periods T1 through T8 and second interval 204 includes time periods T9 through T16.

In time period T1, switches S1 and S4 are closed while switches S2 and S3 are open so that the voltage across primary coil 112 is positive as shown in FIG. 2C. During time period T1, the flux in transformer 110 builds up from zero to its maximum ($\Phi$). Then, in time period T2, controller 124 controls switches S1 and S4 to open and switches S2 and S3 to close so that the voltage across primary coil 112 is negative. During time period T2, the flux in transformer 110 goes from its maximum value in the positive direction to its maximum value in the negative direction ($-\Phi$). In period T3, controller 124 controls switches S1 and S4 to close and switches S2 and S3 to open so that the voltage across primary coil 112 is again positive. During period T3, the flux in transformer 110 goes from its maximum negative value ($-\Phi$) to its maximum positive value ($\Phi$). During subsequent time periods T4 and T5, the processes of time periods T2 and T3, respectively, are repeated, while time period T6 repeats the process of time period T2. Then, in time period T7, switches S1 and S4 are closed and switches S2 and S3 are open so that the voltage across primary coil 112 is again positive. During period T7, the flux in transformer 110 goes from its maximum negative value ($-\Phi$) to zero. Then, in period T8, all switches S1 to S4 are open so there is no voltage across primary coil 112, and any remaining flux in transformer 110 will decay during time period T8.

During second interval 204, the open and closed positions of switches S1 to S4, and the direction of both the voltage across primary coil 112 and the flux in transformer 110 are inverted from those of the corresponding time periods in the first interval. Note that during each interval, as shown in FIG. 2C, the total duration of positive voltage across primary coil 112 is equal to the total duration of negative voltage across primary coil 112. Additionally, in the exemplary graph of the flux in transformer 110 depicted in FIG. 2D, the flux is zero at the start of each interval and zero during the last time period (e.g., T8 and T16). In other embodiments in which the total duration of positive voltage across primary coil 112 is not equal to the total duration of negative voltage across primary coil 112 (e.g., due to imperfections in controller 124, switches S1-S4 and/or for any other reason), time period T8 may be set to allow the flux in transformer 110 to decay enough so that flux does not build up in the core each interval, potentially saturating the core. Note that in some embodiments the voltage during the last time period in each interval (e.g., time periods T8 and T16) need not be reduced to exactly zero; it only needs to be reduced enough so that the flux in transformer 110 decays enough to prevent transformer 110 from saturating the core during any interval.

Note that the first voltage pulse across primary coil 112 at the start of an interval (e.g., T9) is in the opposite direction to the first voltage pulse (e.g., T1) of the previous interval. Additionally, note that the first voltage pulse across primary coil 112 at the start of an interval (e.g., T9) is in the opposite direction to the last voltage pulse (e.g., T7) of the previous interval. In some embodiments, this helps to reduce the build-up of flux in transformer 110. Furthermore, note that in the embodiment depicted in FIGS. 2A-2D, the first pulse (e.g., T1) and the last pulse (e.g., T7) in an interval are one-half the width of each of the other pulses (e.g., T2-T6) in the interval.

Note that the voltage across each arm of secondary coil 114 is determined by the voltage across primary coil 112 (e.g., as depicted in FIG. 2C) and the ratio of the turns in primary coil 112 and each arm of secondary coil 114. This voltage passes alternately through diode 116 and diode 118 and onto capacitor 120 and output 122.

Controller 124 may alter one or more parameters of the voltage across primary coil 112 during any portion of any interval, by varying one or more of the control parameters used to control H-bridge 108, including but not limited to number of cycles per interval 206, primary coil 112 dead-time 208 (e.g., T8 and T16), and cycle duration 210.

Figure 3A:
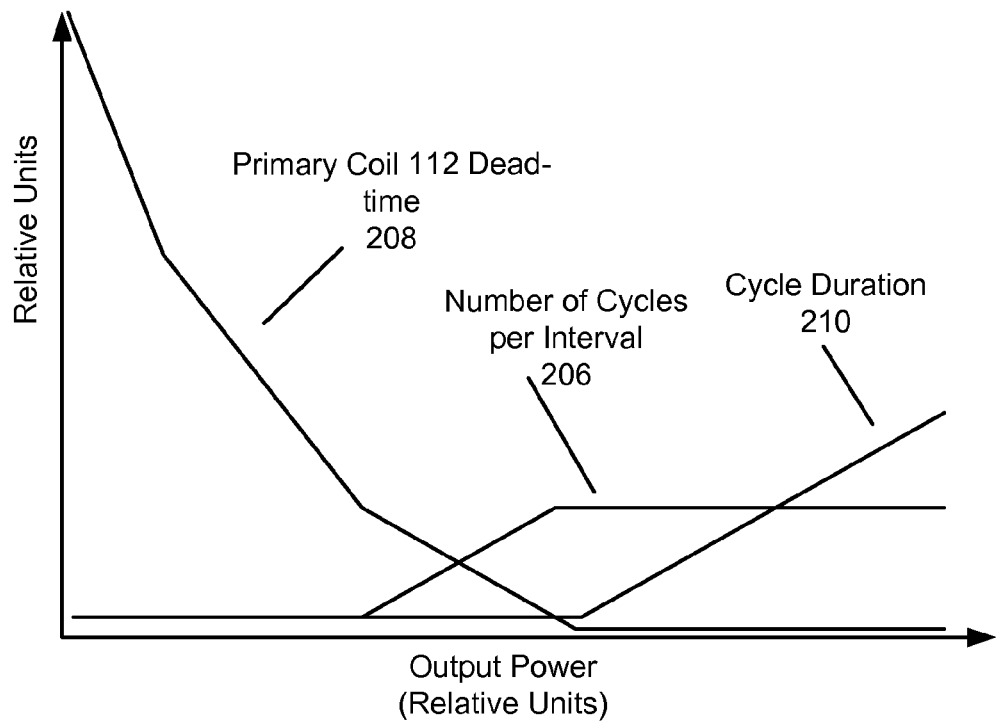
FIG. 3A depicts an exemplary graph of the variation of control parameters for a controller controlling the voltage across the primary coil of an adapter transformer vs. output power of the adapter in accordance with an embodiment.

FIG. 3A depicts an exemplary graph of the variation of these three parameters by controller 124 when controlling the voltage across the primary coil vs. output power of the adapter in accordance with an embodiment. Initially, as more power is demanded from the adapter, controller 124 will reduce the duration of primary coil 112 dead-time 208 to generate more power. Eventually, as the power demand increases, number of cycles per interval 206 will begin to increase and then eventually plateau. Then, as the power demand continues to increase, cycle duration 210 will increase. This is depicted in more detail in FIG. 3B.

Figure 3B:
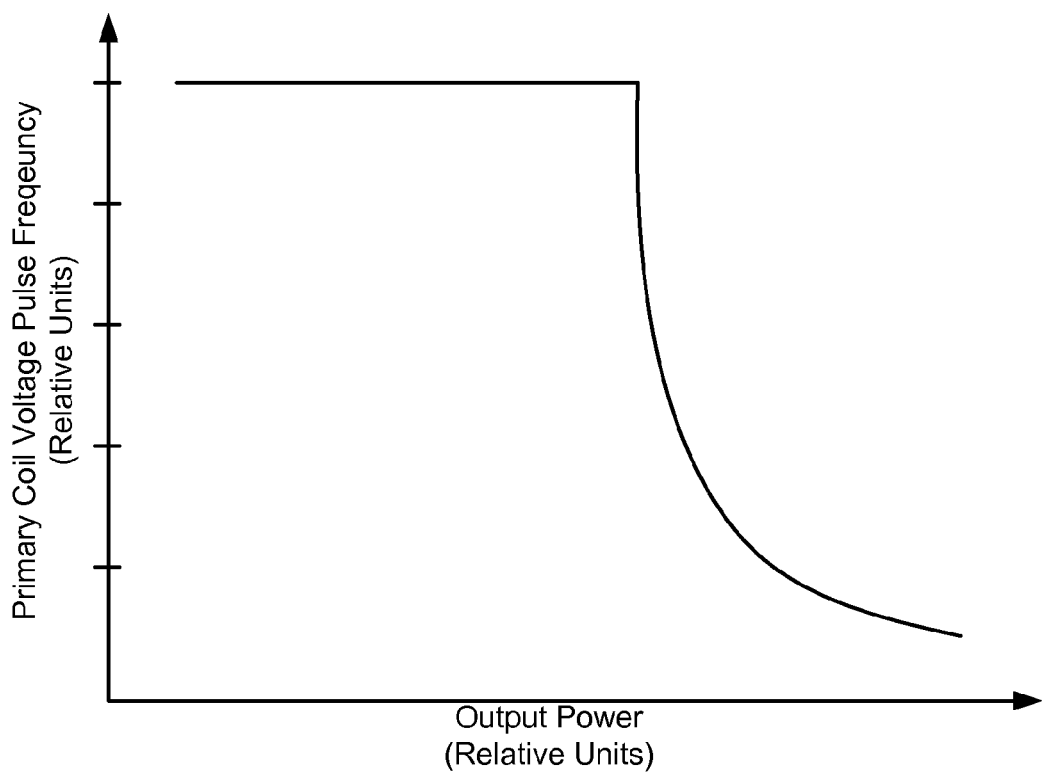
FIG. 3B depicts an exemplary graph of cycle frequency of the voltage across the primary coil of an adapter transformer vs. output power of the adapter in accordance with an embodiment.

FIG. 3B depicts an exemplary graph of cycle frequency of the voltage across the primary coil of an adapter transformer vs. output power of the adapter in accordance with an embodiment. In some embodiments, at low power, controller 124 controls the cycle frequency at about 500,000 Hz. Then, as the power demand increases, the controller starts to reduce the cycle frequency, eventually reducing it to about 50,000 Hz.

Figures 4A, 4B, 4C, 4D:
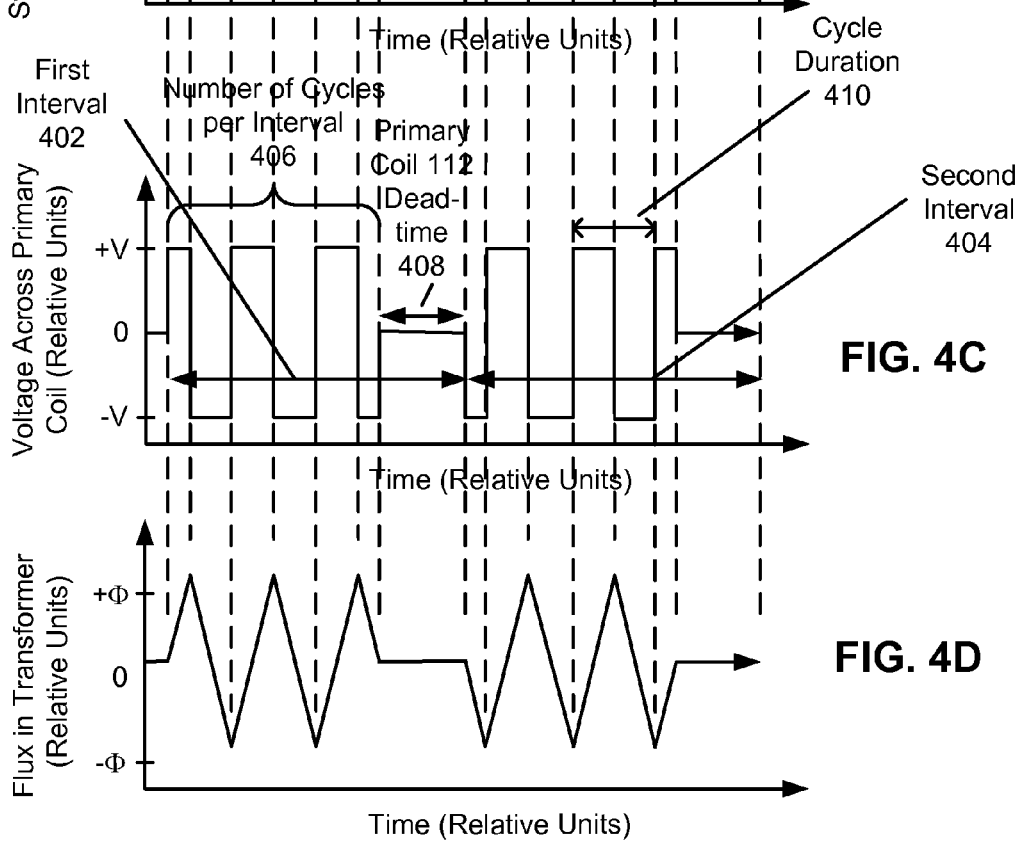
FIG. 4A depicts an exemplary graph of an alternate control signal controlling two switches in an H-bridge coupled to the primary coil of a transformer in accordance with an embodiment.
FIG. 4B depicts an exemplary graph of an alternate control signal controlling two other switches in an H-bridge coupled to the primary coil of a transformer in accordance with an embodiment.
FIG. 4C depicts an exemplary graph of the voltage across the primary coil of an adapter transformer due to the alternate control signal in accordance with an embodiment.
FIG. 4D depicts an exemplary graph of the flux in the transformer due to the voltage across the coil depicted in FIG. 4C in accordance with an embodiment.

FIGS. 4A and 4B depict exemplary graphs of alternate control signals from controller 124 controlling, respectively, switches S1 and S4, and switches S2 and S3 in H-bridge 108 in accordance with an embodiment. FIG. 4C depicts an exemplary graph of the voltage across primary coil 112 as a result of the switching signals depicted in FIGS. 4A and 4B. FIG. 4D depicts an exemplary graph of the flux in transformer 110 due to the voltage across the coil depicted in FIG. 4C in accordance with an embodiment.

Note that for exemplary purposes only two intervals are depicted in each graph, first interval 402 and second interval 404. Embodiments may include more or fewer intervals. First interval 402 includes time periods T1 through T7 and second interval 404 includes time periods T8 through T14.

In time period T1, switches S1 and S4 are closed while switches S2 and S3 are open so that the voltage across primary coil 112 is positive as shown in FIG. 4C. During time period T1, the flux in transformer 110 builds up from zero to its maximum ($\Phi$). Then, in time period T2, controller 124 controls switches S1 and S4 to open and switches S2 and S3 to close so that the voltage across primary coil 112 is negative. During time period T2, the flux in transformer 110 goes from its maximum value in the positive direction to its maximum value in the negative direction ($-\Phi$). In period T3, controller 124 controls switches S1 and S4 to close and switches S2 and S3 to open so that the voltage across primary coil 112 is again positive. During period T3, the flux in transformer 110 goes from its maximum negative value ($-\Phi$) to its maximum positive value ($\Phi$). During subsequent time periods T4 and T5, the processes of time periods T2 and T3, respectively, are repeated. Then, in time period T6, switches S1 and S4 are open and switches S2 and S3 are closed so that the voltage across primary coil 112 is negative, and the flux in transformer 110 goes from its maximum positive value ($\Phi$) to zero. Then, in period T7, all switches S1 to S4 are open so there is no voltage across primary coil 112, and any remaining flux in transformer 110 will decay during time period T7.

During second interval 404, the open and closed positions of switches S1 to S4, and the direction of both the voltage across primary coil 112 and the flux in transformer 110 are inverted from those of the corresponding time periods in the first interval. Note that during each interval, as shown in FIG. 4C, the total duration of positive voltage across primary coil 112 is equal to the total duration of negative voltage across primary coil 112. Additionally, in the exemplary graph of the flux in transformer 110 depicted in FIG. 4D, the flux is zero at the start of each interval and zero during the last time period (e.g., T7 and T14). In other embodiments in which the total duration of positive voltage across primary coil 112 is not equal to the total duration of negative voltage across primary coil 112 (e.g., due to imperfections in controller 124, switches S1-S4 and/or for any other reason), time period T7 may be set to allow the flux in transformer 110 to decay enough so that flux does not build up in the core each interval, potentially saturating the core. Note that in some embodiments the voltage during the last time period in each interval (e.g., time periods T7 and T14) need not be reduced to exactly zero; it only needs to be reduced enough so that the flux in transformer 110 decays enough to prevent transformer 110 from saturating the core during any interval.

The first voltage pulse across primary coil 112 at the start of an interval (e.g., T8) is in the opposite direction to the first voltage pulse (e.g., T1) of the previous interval. In some embodiments, this helps to reduce the build-up of flux in transformer 110. Additionally, note that in the embodiment depicted in FIGS. 4A-4D, the first pulse (e.g., T1) and the last pulse (e.g., T6) in an interval are one-half the width of each of the other pulses (e.g., T2-T5) in the interval.

Note that controller 124 may alter one or more parameters of the voltage across primary coil 112 during any portion of any interval, by varying one or more of the control parameters used to control H-bridge 108, including but not limited to number of cycles per interval 406, primary coil 112 dead-time 408 (e.g., T7 and T14), and cycle duration 410. Additionally, these parameters may be controlled by controller 124 as discussed above with respect to FIGS. 3A and 3B.

Referring back to FIG. 1, the voltage pulses across primary coil 112 as discussed above induce voltage across secondary coil 114. For example, a positive voltage across primary coil 112 induces a positive voltage in one arm of secondary coil 114 (e.g., between the center tap and diode 116), while a negative voltage across primary coil 112 induces a positive voltage in the other arm of secondary coil 114 (e.g., between the center tap and diode 118). The positive voltage from each arm passes through the respective diode and across capacitor 120 to output 122.

Note that in embodiments in which a step-up converter is coupled after capacitor 120, the step-up converter may be a boost converter, and may be controlled by controller 124 or by a separate controller. The step-up converter may be used to adjust the power factor of the adapter by, for example, stepping-up the voltage from secondary coil 114 to a value larger than the peak voltage output from secondary coil 114. Additionally, note that in embodiments such as FIG. 1 which include a transformer with a center tapped secondary coil, the voltage output from secondary coil 114 may be stepped-up as described in the U.S. patent application Ser. No. 13/568,414 entitled "Controlling an Adapter Transformer Voltage," by Louis Luh and Eric Smith, which was filed on 7 Aug. 2012, which issued as U.S. Pat. No. 8,817,493 on 26 Aug. 2014, and which is hereby fully incorporated herein by reference.

Figure 5:
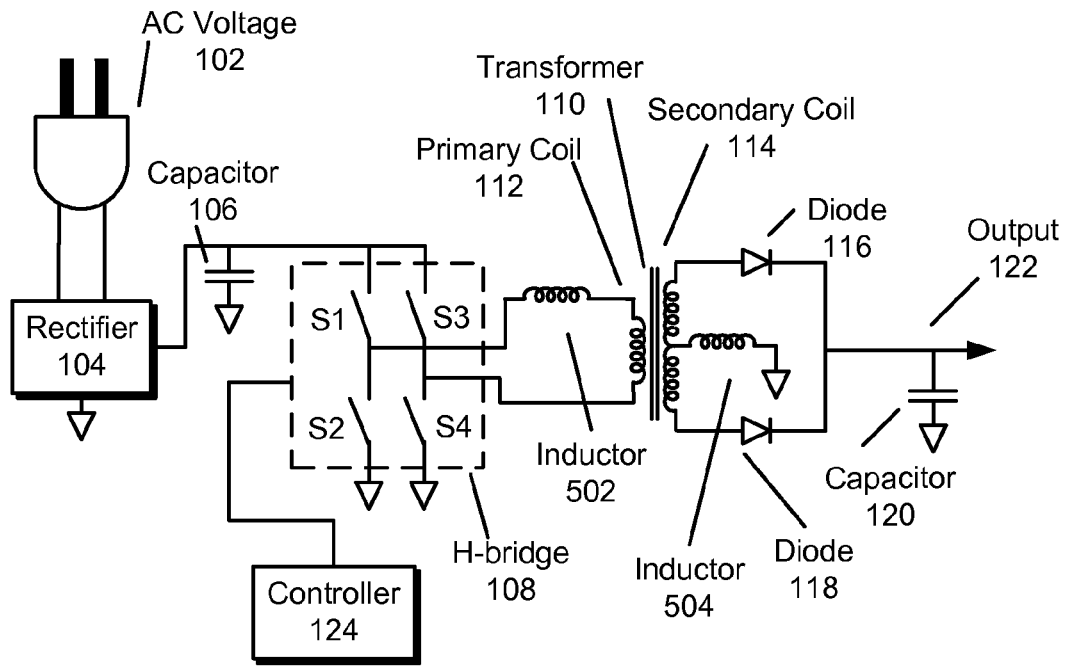
FIG. 5 shows an adapter similar to the embodiment of FIG. 1 that includes two additional inductors in accordance with an embodiment.

FIG. 5 shows an embodiment similar to the one depicted in FIG. 1, but with inductor 502 placed between H-bridge 108 and primary coil 112, and inductor 504 between the center tap of secondary coil 114 and ground. Inductor 502 may be any type of inductor and may be selected based on factors including but not limited to the desired switching characteristics of one or more switches in H-bridge 108, such as soft switching for zero-voltage switching (ZVS). Inductor 504 may be any type of inductor and may be selected based on factors including but not limited to reducing a peak current present at diode 116 and/or diode 118. The embodiment of FIG. 5 operates similarly to the embodiment of FIG. 1 as described above. Note that in some embodiments either inductor 502 or inductor 504 may be omitted.

Figure 6:
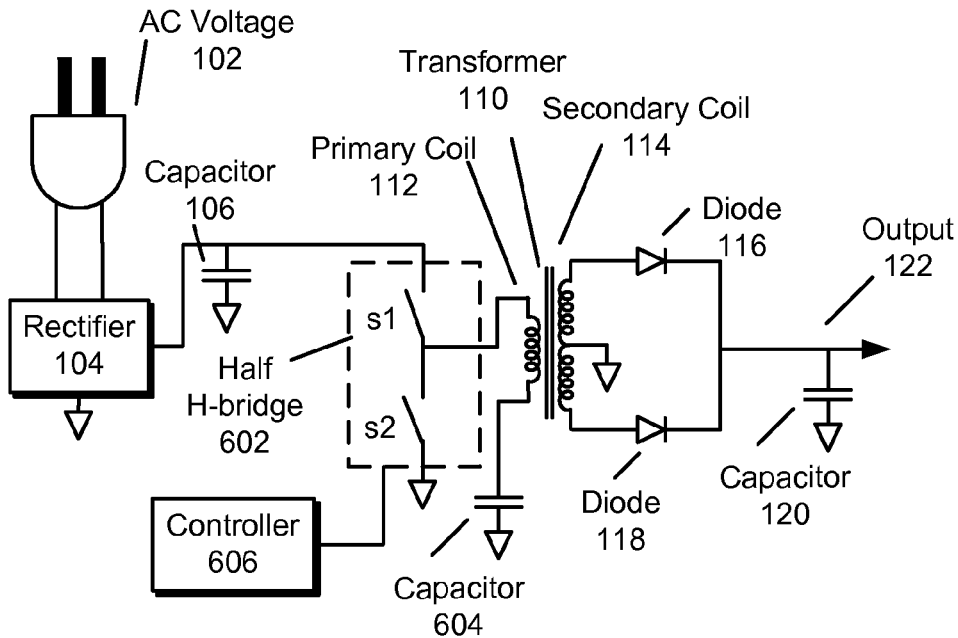
FIG. 6 shows an adapter including a half H-bridge and a center-tapped secondary coil in accordance with an embodiment.

FIG. 6 shows an embodiment similar to the one depicted in FIG. 1, with H-bridge 108 replaced by half H-bridge 602 and capacitor 604, and controller 124 replaced by controller 606. Half H-bridge 602 is any half H-bridge that includes two individual switches s1 and s2, each of which is controlled by controller 606. Half H-bridge 602 uses switches s1 and s2 in combination with capacitor 604 to control the voltage across primary coil 112 in transformer 110. For example, when switch s1 is closed and switch s2 is open, the voltage from the top to the bottom of primary coil 112 is positive and capacitor 604 is charging; when switch s1 is open and switch s2 is closed, the voltage from the top to the bottom of primary coil 112 is negative and capacitor 604 is discharging; and when switch s1 is open and switch s2 is open there will be no voltage across primary coil 112. Note that switches s1 and s2 can each be any type of switch implemented in any technology that can switch in response to a control signal. For example, switches s1 and s2 may include but are not limited to relays, or transistors such as FETs, including MOSFET transistors, and may be implemented using any combination of discrete and integrated components, and analog and/or digital technology. Note that capacitor 604 may be any capacitor selected based on factors including but not limited to the peak voltage from AC voltage 102, the switching frequency of half H-bridge 602 as controlled by controller 606 and/or the output power of the adapter.

Controller 606 is a controller implemented in any combination of hardware and/or software and in any technology and may be implemented using the same or similar technology as controller 124, and may include any combination of integrated and discrete components and may be implemented in any hardware module or apparatus. Controller 606 controls each switch s1 and s2 in half H-bridge 602 using similar processes and hardware as used by controller 124 to control, respectively, switches S1 and S4, and switches S2 and S3 as described above. For example, referring to FIGS. 2A and 2B, controller 606 may control switch s1 based on the waveform of FIG. 2A and switch s2 based on the waveform in FIG. 2B to generate the voltage waveform depicted in FIG. 2C.

Figure 7:
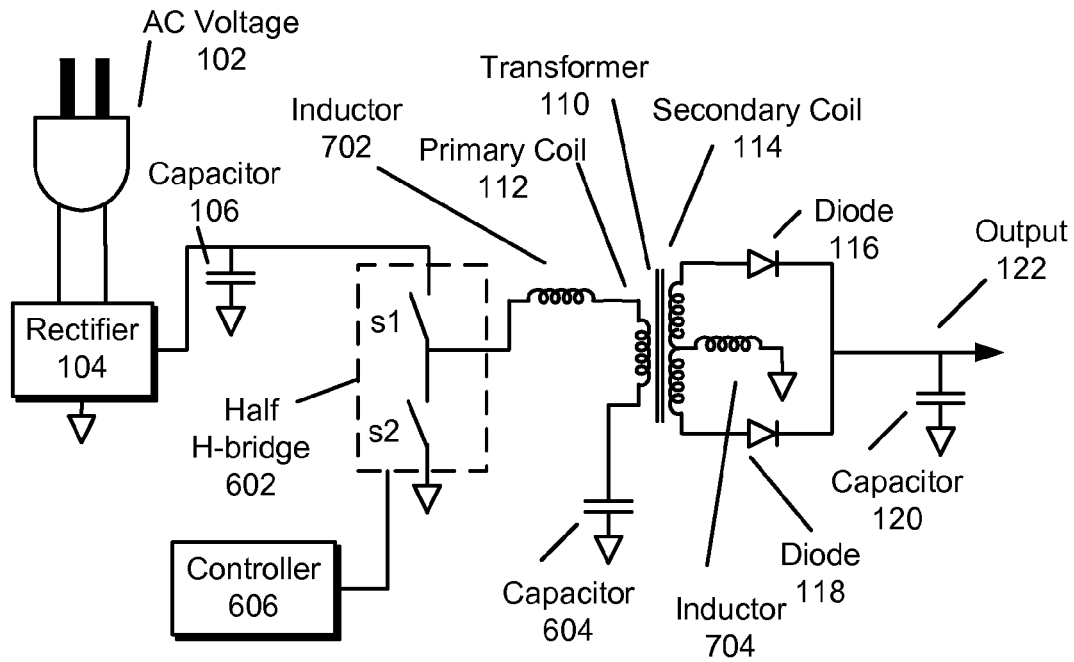
FIG. 7 shows an adapter similar to the embodiment of FIG. 6 that includes two additional inductors in accordance with an embodiment.

FIG. 7 shows an embodiment similar to the one depicted in FIG. 6, but with inductor 702 placed between half H-bridge 602 and primary coil 112, and inductor 704 between the center tap of secondary coil 114 and ground. Inductor 702 may be any type of inductor and may be selected based on factors including but not limited to the desired switching characteristics of one or more switches in half H-bridge 602, such as soft switching for zero-voltage switching (ZVS). Inductor 704 may be any type of inductor and may be selected based on factors including but not limited to reducing a peak current present at diode 116 and/or diode 118. The embodiment of FIG. 7 operates similarly to the embodiment of FIG. 6 as described above. Note that in some embodiments either inductor 702 or inductor 704 may be omitted.

Figure 8:
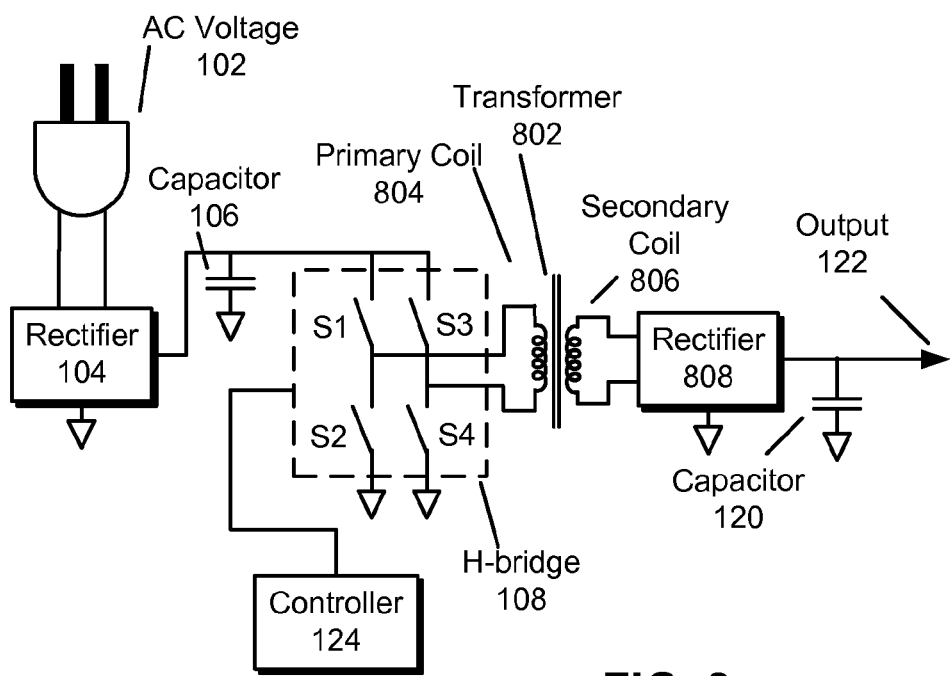
FIG. 8 shows another adapter including an H-bridge in accordance with an embodiment.

FIG. 8 depicts an embodiment similar to the one depicted in FIG. 1. Alternating current (AC) voltage 102 is coupled to rectifier 104 across capacitor 106 and into H-bridge 108. Transformer 802 includes primary coil 804 and secondary coil 806. Primary coil 804 is coupled to the output of H-bridge 108, and secondary coil 806 is coupled through rectifier 808 across capacitor 120 to output 122. As in the embodiment of FIG. 1, controller 124 is coupled to and controls switches S1 through S4 in H-bridge 108.

Transformer 802 can be any transformer with a primary coil and a secondary coil implemented in any technology. The winding ratio of primary coil 804 to secondary coil 806 can be set to any value based on the input voltage and the desired output voltage. Transformer 802 may be a step-down transformer with a turns ratio between primary coil 804 and secondary coil 806 that may be set to any value based on AC voltage 102 and the desired voltage at output 120. For example, in some embodiments, for an expected input voltage of 90 to 120 volts from AC voltage 102 and a desired output voltage in the range of 20 to 30 volts, a turns ratio between primary coil 804 and secondary coil 806 may be chosen to be about 4:1, while for an expected input voltage of 220 to 240 volts from AC voltage 102 for the same desired output voltage range, the turns ratio may be chosen to be about 8:1. In other embodiments, a turns ratio in the range of 4:1 up to 8:1 may be used. Additionally, as described above, in some embodiments a step-up converter is placed after capacitor 120 to step-up the voltage from secondary coil 806 through rectifier 808 based on a desired power factor of the adapter. In some embodiments, the step-up converter steps-up the voltage to between 40 volts and 50 volts, while in other embodiments, the voltage is stepped-up to a value less than 50 volts.

Rectifier 808 is a voltage rectifier that converts the positive and negative voltage output from secondary coil 806 into voltage that is going positive only. Rectifier 808 may include but is not limited to a full-bridge rectifier, a half-bridge rectifier, or any other rectifier that outputs only a positive-going voltage from an input that is positive and negative, and it may be implemented in any technology.

Note that the embodiment of FIG. 8 operates similarly to the embodiment of FIG. 1. As discussed above with reference to FIG. 1, the alternating voltage input into primary coil 112 of transformer 110 (e.g., see FIGS. 2C and 4C) induces voltage in each arm of center tapped secondary coil 114 coupled to diode 116 and diode 118 and results in rectified voltage at capacitor 120. In FIG. 8 the voltage induced in secondary coil 806 as a result of controller 124 controlling switches S1 to S4 as depicted in FIGS. 2A and 2B and/or 4A and 4B results in a positive and negative going voltage across secondary coil 806 that is rectified by rectifier 808 and coupled across capacitor 120 to output 122

Note that in some embodiments an inductor may be coupled between H-bridge 108 and primary coil 804 similar to inductor 502 of FIG. 5. The inductor may be any type of inductor and may be selected based on factors including but not limited to the desired switching characteristics of one or more switches in H-bridge 108, such as soft switching for ZVS.

Figure 9:
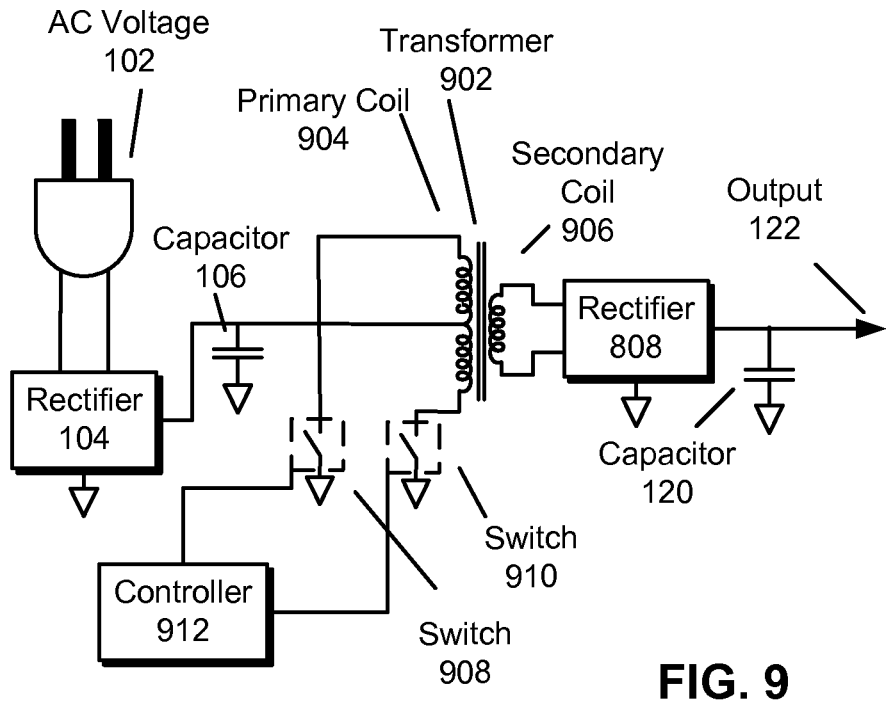
FIG. 9 shows another adapter including a center tapped primary coil in accordance with an embodiment.

In FIG. 9, AC voltage 102 is coupled to rectifier 104 across capacitor 106 and into the center tap of primary coil 904 of transformer 902. Secondary coil 906 is coupled into rectifier 808 and across capacitor 120 to output 122. The top end tap of primary coil 904 is coupled through switch 908 to ground and the bottom end tap of primary coil 904 is coupled through switch 910 to ground. Controller 912 is coupled to and controls switch 908 and switch 910.

Transformer 902 can be any transformer with a center tapped primary coil and a secondary coil implemented in any technology. The winding ratio of each arm of primary coil 904 to secondary coil 906 can be set to any value based on the input voltage and the desired output voltage. Transformer 902 may be a step-down transformer with a turns ratio between each arm of primary coil 904 and secondary coil 906 that may be set to any value based on AC voltage 102 and the desired voltage at output 122. For example, in some embodiments, for an expected input voltage of 90 to 120 volts from AC voltage 102 and a desired output voltage in the range of 20 to 30 volts, a turns ratio between each arm of primary coil 904 and secondary coil 906 may be chosen to be about 4:1, while for an expected input voltage of 220 to 240 volts from AC voltage 102 for the same desired output voltage range, the turns ratio may be chosen to be about 8:1. In other embodiments, a turns ratio in the range of 4:1 up to 8:1 may be used. Additionally, as discussed above, in some embodiments a step-up converter is placed after capacitor 120 to step-up the voltage from secondary coil 906 based on a desired power factor of the adapter. In some embodiments, the step-up converter steps-up the voltage to a value less than 50 volts, while in other embodiments, the voltage is stepped-up to between 40 volts and 50 volts.

Controller 912 controls switch 908 and switch 910 to control the voltage across each arm of primary coil 904 in transformer 902. For example, when switch 908 is closed and switch 910 is open, the voltage from the center tap to the top of primary coil 904 is positive; when switch 908 is open and switch 910 is closed, the voltage from the center tap to the bottom of primary coil 904 is positive; and when both switch 908 and switch 910 are open, there is no voltage across either arm of primary coil 112. Note that switch 908 and switch 910 can each be any type of switch implemented in any technology that can switch in response to a control signal. For example, switch 908 and switch 910 may include but are not limited to relays, or transistors (e.g., N-type) such as FETs, including MOSFET transistors, and may be implemented using any combination of discrete and integrated components, and analog and/or digital technology.

Controller 912 is a controller implemented in any combination of hardware and/or software and in any technology and may be configured and implemented similarly to controller 124. Controller 912 may include any combination of integrated and discrete components and may be implemented in any hardware module or apparatus. Controller 912 controls switch 908 and switch 910 using similar processes and hardware as used by controller 124 to control, respectively, switches S1 and S4, and switches S2 and S3 as described above. For example, referring to FIGS. 2A and 2B, controller 912 may control switch 908 based on the waveform of FIG. 2A and switch 910 based on the waveform in FIG. 2B to generate the alternating polarity voltage waveform depicted in FIG. 2C.

Controller 912 may be coupled to (not shown) and use input received from rectifier 104 and output 122 to control switch 908 and switch 910. Note that the input to controller 912 from output 122 may include an isolation device or circuit (not shown) to electrically isolate the secondary side of transformer 902 from the primary side, and may also include a voltage divider (not shown) to reduce the feedback voltage from output 122 to controller 912.

During operation, the alternating voltage across each arm of primary coil 904 induces an alternating polarity voltage across secondary coil 906 which is rectified in rectifier 508 and coupled to output 122 across capacitor 120. Note that as discussed above, in some embodiments, a step-up converter may be coupled to the adapter in FIG. 9 after capacitor 120.

Figure 10:
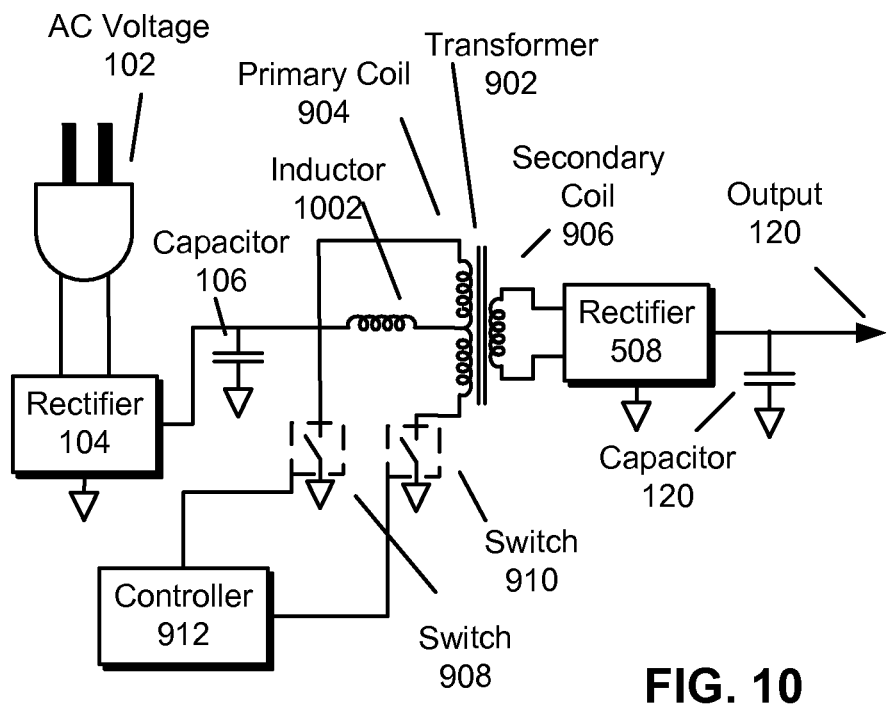
FIG. 10 shows an adapter similar to the embodiment of FIG. 9 that includes an additional inductor in accordance with an embodiment.

The embodiment of FIG. 10 is similar to the embodiment of FIG. 9 with inductor 1002 coupled between capacitor 106 and the center tap of primary coil 904. Inductor 1002 may be any type of inductor and may be selected based on factors including but not limited to the desired switching characteristics of switch 908 and/or switch 910, such as soft switching for ZVS.

Figure 11:
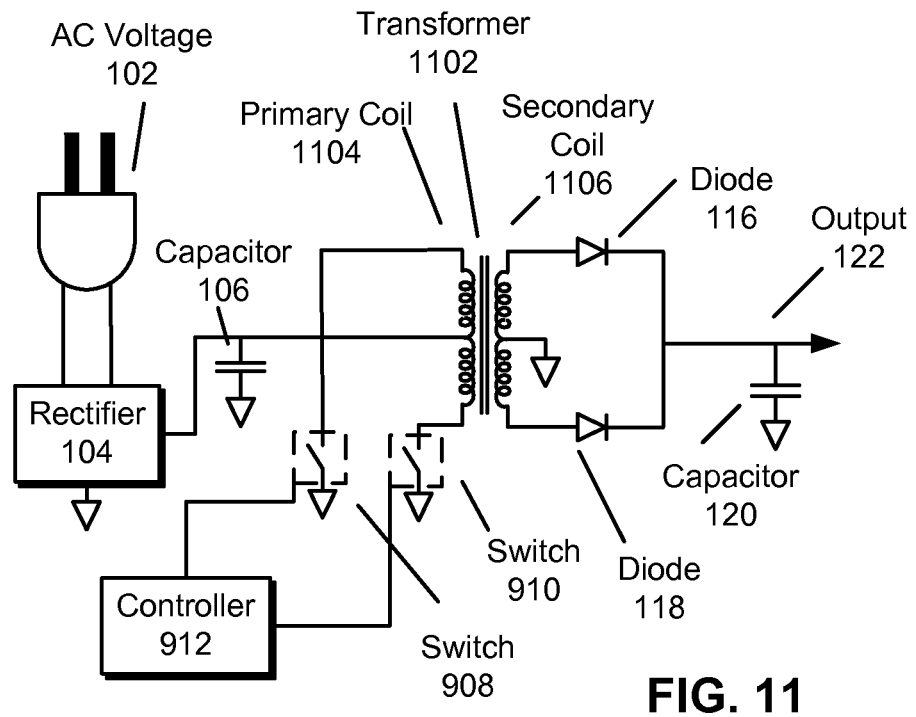
FIG. 11 shows another adapter including a center tapped primary coil and a center tapped secondary coil in accordance with an embodiment.

FIG. 11 depicts an embodiment similar to the one depicted in FIG. 9 with transformer 902 and rectifier 508 replaced by transformer 1102, and diode 116 and diode 118. AC voltage 102 is coupled to rectifier 104 across capacitor 106 and into the center tap of primary coil 1104 of transformer 1102. Secondary coil 1106 has a center tap coupled to ground, and one end tap coupled through diode 116 across capacitor 120 to output 122, and the other end tap coupled through diode 118 across capacitor 120 to output 122. The top end tap of primary coil 1104 is coupled through switch 908 to ground and the bottom end tap of primary coil 1104 is coupled through switch 910 to ground. Controller 912 is coupled to and controls switch 908 and switch 910.

Transformer 1102 can be any transformer with a center tapped primary coil and a center tapped secondary coil implemented in any technology. The winding ratio of each arm of primary coil 1104 to each arm of secondary coil 1106 can be set to any value based on the input voltage and the desired output voltage. Transformer 1102 may be a step-down transformer with a turns ratio between each arm of primary coil 1104 and each arm of secondary coil 1106 that may be set to any value based on AC voltage 102 and the desired voltage at output 122. For example, in some embodiments, for an expected input voltage of 90 to 120 volts from AC voltage 102 and a desired output voltage in the range of 20 to 30 volts, a turns ratio between each arm of primary coil 1104 and each arm of secondary coil 1106 may be chosen to be about 4:1, while for an expected input voltage of 220 to 240 volts from AC voltage 102 for the same desired output voltage range, the turns ratio may be chosen to be about 8:1. In other embodiments, a turns ratio in the range of 4:1 up to 8:1 may be used.

Similar to the embodiment of FIG. 9 as discussed above, controller 912 controls switch 908 and switch 910 to control the voltage across each arm of primary coil 1104 in transformer 1102. For example, when switch 908 is closed and switch 910 is open, the voltage from the center tap to the top of primary coil 904 is positive; when switch 908 is open and switch 910 is closed, the voltage from the center tap to the bottom of primary coil 904 is positive; and when both switch 908 and switch 910 are open, there is no voltage across either arm of primary coil 1104.

During operation, the alternating voltage across each arm of primary coil 1104 induces an alternating polarity voltage across each arm of secondary coil 1106. For example, a positive voltage from the center tap of primary coil 1104 to the top end tap of primary coil 1104 (switch 908 closed and switch 910 open) induces a positive voltage in one arm of secondary coil 1106 (e.g., between the center tap and diode 116), while a positive voltage from the center tap of primary coil 1104 to the bottom end tap of primary coil 1104 (switch 908 open and switch 910 closed) induces a positive voltage in the other arm of secondary coil 1106 (e.g., between the center tap and diode 118). The positive voltage from each arm passes through the respective diode and across capacitor 120 to output 122. Note that as discussed above, in some embodiments, a step-up converter may be coupled to the adapter in FIG. 11 after capacitor 120.

Figure 12:
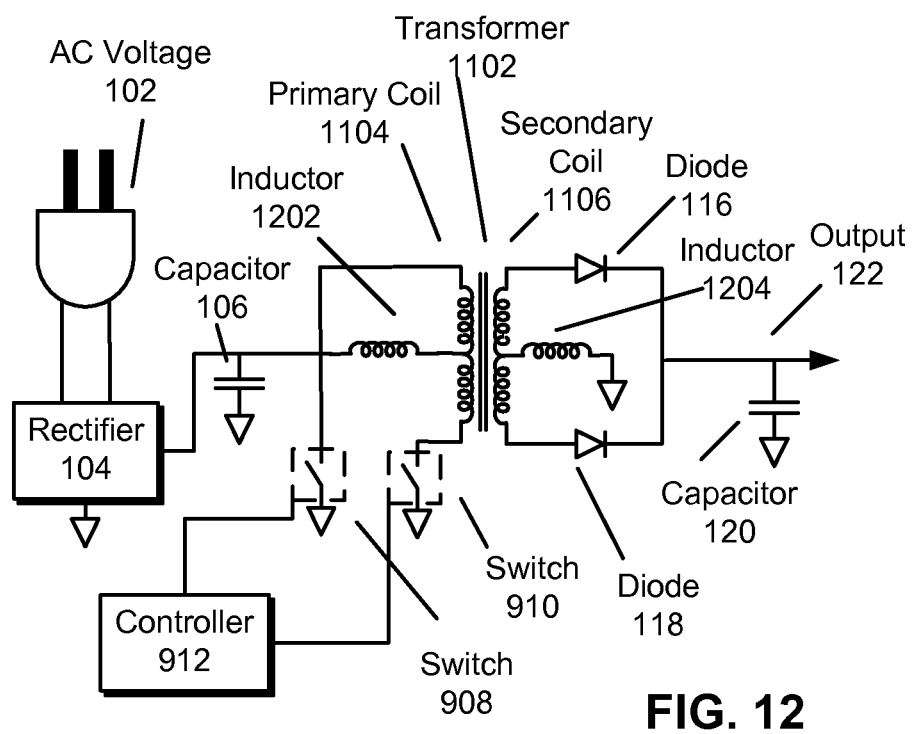
FIG. 12 shows an adapter similar to the embodiment of FIG. 11 that includes two additional inductors in accordance with an embodiment.

FIG. 12 shows an embodiment similar to the one depicted in FIG. 11, but with inductor 1202 placed between the top node of capacitor 106 and the center tap of primary coil 1104, and inductor 1204 between the center tap of secondary coil 1106 and ground. Inductor 1202 may be any type of inductor and may be selected based on factors including but not limited to the desired switching characteristics of switch 908 and/or switch 910, such as soft switching for zero-voltage switching (ZVS). Inductor 1204 may be any type of inductor and may be selected based on factors including but not limited to reducing a peak current present at diode 116 and/or diode 118. The embodiment of FIG. 12 operates similarly to the embodiment of FIG. 11 as described above. Note that in some embodiments either inductor 1202 or inductor 1204 may be omitted.

Figure 13:
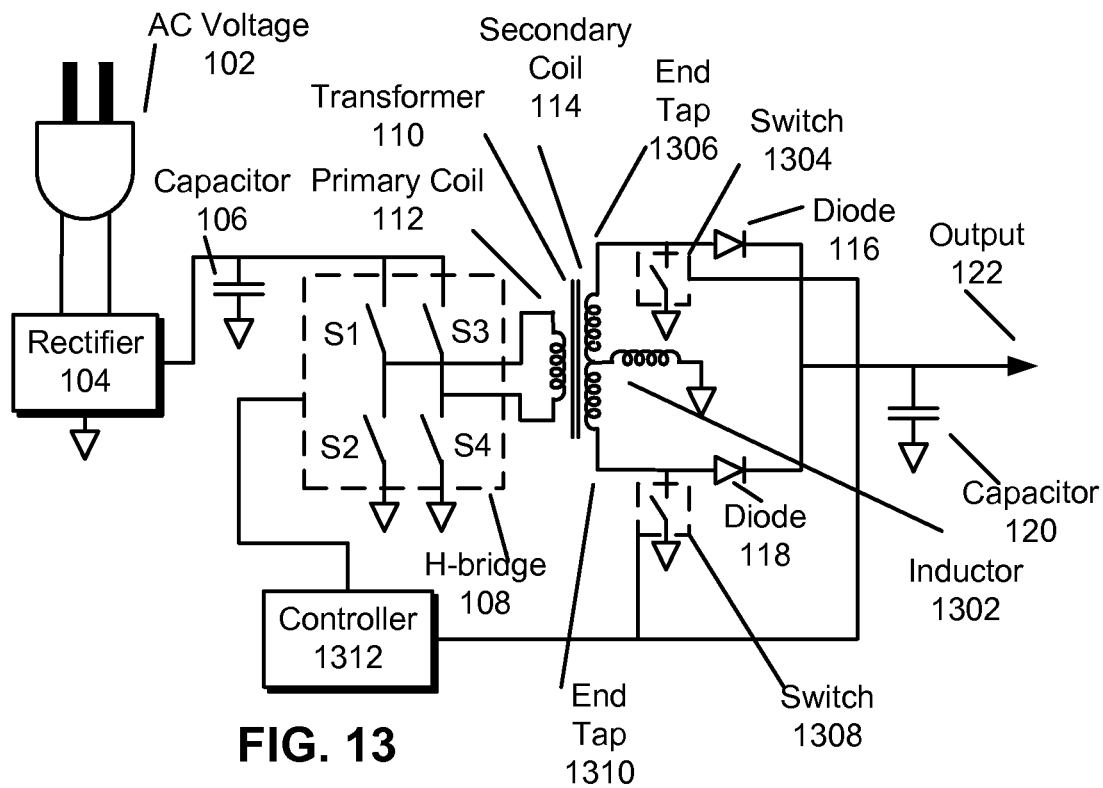
FIG. 13 shows an adapter similar to the one depicted in FIG. 1 that includes an inductor between the center tap of the secondary coil and ground, and a switch coupled between one end tap of the secondary coil and ground and another switch coupled between the other end tap of the secondary coil and ground in accordance with an embodiment.

FIG. 13 shows an adapter similar to the one depicted in FIG. 1, with the addition of inductor 1302 between the center tap of secondary coil 114 and ground, switch 1304 coupled between end tap 1306 and ground, switch 1308 coupled between end tap 1310 and ground, and controller 1312 coupled to and controlling H-bridge 108, switch 1304 and switch 1308.

Inductor 1302 can be any type of inductor implemented in any technology. The inductance of inductor 1302 can be selected based on parameters including the inductance of secondary coil 114. In some embodiments, the ratio between the inductance of each arm of secondary coil 114 and the inductance of inductor 1302 is 5, 10 or in the range from 2 to 20. For example, in one embodiment, the inductance of one arm of secondary coil 114 is 100 microhenries and the inductance of inductor 1302 is selected to be 10 microhenries.

Switch 1304 and switch 1308 can each be any type of switch implemented in any technology that can switch in response to a control signal. For example, switch 1304 and/or switch 1308 may include but are not limited to relays, or transistors such as FETs, including MOSFET transistors, and may be implemented using any combination of discrete and integrated components, and analog and/or digital technology. Controller 1312 is similar to controller 124 and also includes control logic, programming and/or circuitry to control switch 1304 and switch 1308 as described below.

The embodiment of FIG. 13 operates similarly to the embodiment of FIG. 1. Controller 1312 controls H-bridge 108 in the same manner as controller 124. In addition, controller 1312 may control switch 1304 and switch 1308 to boost the voltage from secondary coil 114 as depicted in FIGS. 14B and 14C discussed below.

Figures 14A, 14B, 14C:
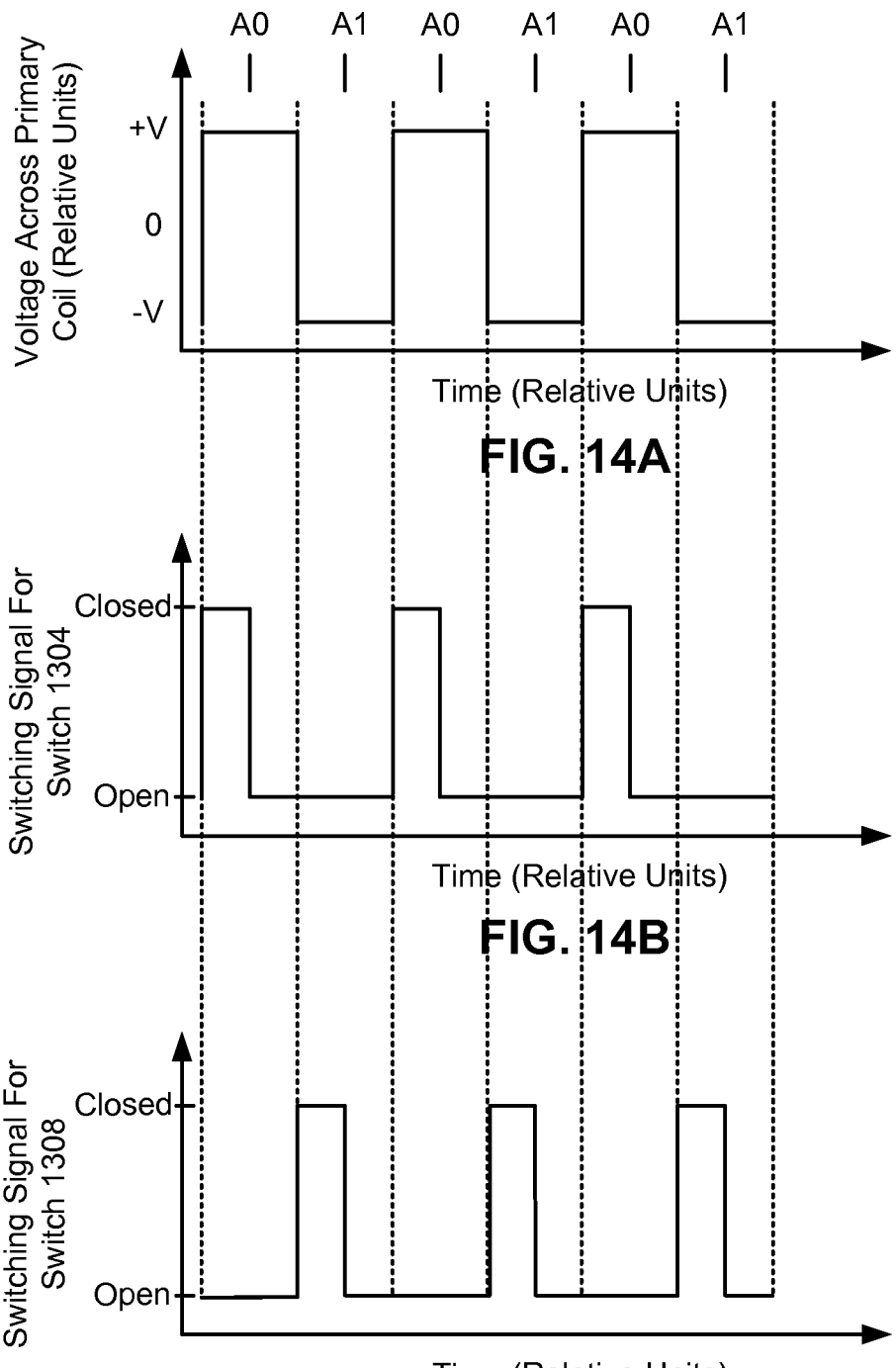
FIG. 14A depicts an exemplary graph of the voltage across the primary coil of an adapter transformer in accordance with an embodiment.
FIG. 14B depicts an exemplary graph of a control signal controlling switch 1304 in accordance with an embodiment.
FIG. 14C depicts an exemplary graph of a control signal controlling switch 1308 in accordance with an embodiment.

FIG. 14A depicts an exemplary graph of the voltage across the primary coil 112 (similar to that depicted in FIG. 2C and FIG. 4C), and FIGS. 14B and 14C depict the relative timing of the control signals, respectively, for switch 1304 and switch 1308 from controller 1312 to boost the voltage from secondary coil 114. As depicted in FIG. 14A, during time period A0 the voltage across primary coil 112 is positive. This induces a positive voltage in secondary coil 114 between the center tap and end tap 1306. As depicted in FIG. 14B, controller 1312 controls switch 1304 to remain closed during the first portion of time period A0; then, during the second portion, controller 1312 controls switch 1304 to open, boosting the voltage from the top arm of secondary coil 114. Controller 1312 may vary the portion of A0 during which switch 1304 is open/closed in order to vary the magnitude of the voltage boost generated. Note that, as depicted in FIG. 14C, controller 1312 controls switch 1308 to remain open during time period A0.

As depicted in FIG. 14C, during time period A1, controller 1312 controls switch 1308 in a similar fashion to boost the voltage when the voltage across primary coil 112 is negative and the induced voltage in secondary coil 114 is positive from the center tap to end tap 1310 across the bottom arm of secondary coil 114. Controller 1312 controls switch 1308 to remain closed during the first portion of time period A1; then, during the second portion, controller 1312 controls switch 1308 to open, boosting the voltage from the bottom arm of secondary coil 114. Note that as depicted in FIG. 14B controller 1312 controls switch 1304 to remain open during time period A1. Controller 1312 may vary the portion of A1 during which switch 1308 is open/closed in order to vary the magnitude of the voltage boost generated.

Also note that if transformer 110 has the opposite polarity, then positive voltage is induced in the opposite arm of secondary coil 114 during time periods A0 and A1, and the switching signals for switch 1304 and switch 1308 are interchanged. Additionally, if controller 1312 is not going to boost the voltage from transformer 110, then controller 1312 controls switch 1304 and switch 1308 both to remain open The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:
1. An adapter for electrical power, comprising:
a rectifier with an input and an output;
a transformer with a primary coil and a secondary coil, wherein the primary coil includes a center tap coupled to the output of the rectifier, and a first end tap and a second end tap;
a first switch coupled between the first end tap and a primary side ground;
a second switch coupled between the second end tap and the primary side ground; and a controller coupled to the first switch and to the second switch and configured to control the first switch and the second switch so that during each of one or more intervals,
    the first switch and the second switch are alternately open and closed a predetermined number of times, wherein at each interval an initial switch that is closed at the beginning of the interval alternates between the first switch and the second switch, and wherein after the predetermined number of times, both the first switch and the second switch are opened for a predetermined time period, wherein the controller is further configured so that a duration that the initial switch is closed during a first of the predetermined number of times is equal to a duration that a switch is closed during a last of the predetermined number of times, and the duration that the initial switch is closed during the first of the predetermined number of times is equal to one half of a duration that a switch is closed during a second of the predetermined number of times.

2. The adapter of claim 1, further comprising:
an inductor coupled between the output of the rectifier and the primary coil.

3. The adapter of claim 1, further comprising:
a first diode with an anode and a cathode; and
a second diode with an anode and a cathode, wherein the secondary coil further comprises a center tap coupled to a secondary side ground, a first end tap coupled to the anode of the first diode and a second end tap coupled to the anode of the second diode, wherein the cathode of the first diode is coupled to the cathode of the second diode.

4. The adapter of claim 3, further comprising:
a second inductor coupled between the center tap of the secondary coil and the secondary side ground.

5. The adapter of claim 1, wherein the controller is further configured so that a total duration that the first switch is closed during each interval is equal to a total duration that the second switch is closed during each interval.

6. The adapter of claim 1, wherein the controller is further configured so that at least one of a frequency at which the first switch and the second switch are alternately open and closed, the predetermined number of times the first switch and the second switch are alternately open and closed, and the predetermined time period is changed based on a power demand from the adapter.

7. An adapter for electrical power, comprising:
a first rectifier with an input and an output;
an H-bridge with an input and an output, wherein the output of the first rectifier is coupled to the input of the H-bridge;
a transformer with a primary coil and a secondary coil, wherein the primary coil is coupled to the output of the H-bridge;
a second rectifier with an input and an output, wherein the secondary coil is coupled to the input of the second rectifier; and
a controller coupled to the H-bridge and configured to control the H-bridge to alternate a polarity of a voltage across the primary coil between a first polarity and a second polarity a predetermined number of times, wherein a start polarity of the voltage across the primary coil during each interval alternates between the first polarity and the second polarity, and wherein after the predetermined number of times, the controller is configured to create an open circuit between the first rectifier and the primary coil for a predetermined time period, wherein the controller is further configured so that a duration of the start polarity during a first of the predetermined number of times is equal to a duration of an end polarity of the voltage across the primary coil during a last of the predetermined number of times, and a duration of each alternation of the polarity of the voltage across the primary coil after the first of the predetermined number of times and before the last of the predetermined number of times is twice the duration of the start polarity during the first of the predetermined number of times.

8. The adapter of claim 7, wherein the controller is further configured so that a total duration of the first polarity during the predetermined number of times is equal to a total duration of the second polarity during the predetermined number of times.

9. The adapter of claim 7, further comprising:
an inductor coupled between the output of the H-bridge and the primary coil.

10. The adapter of claim 7, wherein the controller is further configured so that at least one of a frequency at which the polarity of the voltage across the primary coil is alternated, the predetermined number of times the polarity of the voltage pulse across the primary coil is alternated, and the predetermined time period is changed based on a power demand from the adapter.

11. An adapter for electrical power, comprising:
a rectifier with an input and an output;
a half H-bridge with an input and an output, wherein the output of the rectifier is coupled to the input of the half H-bridge;
a transformer with a primary coil and a secondary coil, wherein the primary coil has a first end tap and a second end tap and the first end tap is coupled to the output of the half H-bridge, and wherein the secondary coil has a center tap coupled to a secondary side ground, and a third end tap and a fourth end tap;
a capacitor coupled between the second end tap of the primary coil and a primary side ground;
a first diode with an anode and a cathode;
a second diode with an anode and a cathode, wherein the third end tap of the secondary coil is coupled to the anode of the first diode and the fourth end tap of the secondary coil is coupled to the anode of the second diode, wherein the cathode of the first diode is coupled to the cathode of the second diode; and
a controller coupled to the half H-bridge and configured to control the half H-bridge to alternate a polarity of a voltage across the primary coil between a first polarity and a second polarity a predetermined number of times, wherein a start polarity of the voltage across the primary coil during each interval alternates between the first polarity and the second polarity, and wherein after the predetermined number of times, the controller is configured to create an open circuit between the first rectifier and the primary coil for a predetermined time period, wherein the controller is further configured so that a duration of the start polarity during a first of the predetermined number of times is equal to a duration of an end polarity of the voltage across the primary coil during a last of the predetermined number of times, and a duration of each alternation of the polarity of the voltage across the primary coil after the first of the predetermined number of times and before the last of the predetermined number of times is twice the duration of the start polarity during the first of the predetermined number of times.

12. The adapter of claim 11, wherein the controller is further configured so that a total duration of the first polarity during the predetermined number of times is equal to a total duration of the second polarity during the predetermined number of times.

13. The adapter of claim 11, further comprising:
an inductor coupled between the output of the half H-bridge and the first end tap of the primary coil.

14. The adapter of claim 11, further comprising:
a second inductor coupled between the center tap and the secondary side ground.

15. The adapter of claim 11, wherein the controller is further configured so that at least one of a frequency at which the polarity of the voltage across the primary coil is alternated, the predetermined number of times the polarity of the voltage pulse across the primary coil is alternated, and the predetermined time period is changed based on a power demand from the adapter.

* * * * *